(12) United States Patent
Lewinnek et al.

(10) Patent No.: US 12,535,523 B2
(45) Date of Patent: Jan. 27, 2026

(54) OPTICAL ALIGNMENT IN A TEST SYSTEM

(71) Applicant: Teradyne, Inc., North Reading, MA (US)

(72) Inventors: David W Lewinnek, Reading, MA (US); Isaac N Silva, Billerica, MA (US); Brandon R Fisher, Boston, MA (US); Brendan Hehir, Somerville, MA (US)

(73) Assignee: Teradyne, Inc., North Reading, MA (US)

( * ) Notice: Subject to any disclaimer, the term of this patent is extended or adjusted under 35 U.S.C. 154(b) by 67 days.

(21) Appl. No.: 18/440,167

(22) Filed: Feb. 13, 2024

(65) Prior Publication Data

US 2025/0258219 A1    Aug. 14, 2025

(51) Int. Cl.
*G01R 31/28* (2006.01)
*G01R 1/073* (2006.01)

(52) U.S. Cl.
CPC ..... *G01R 31/2891* (2013.01); *G01R 1/07342* (2013.01); *G01R 31/2887* (2013.01)

(58) Field of Classification Search
CPC .................. G01R 31/2834; G01R 31/2887
See application file for complete search history.

(56) References Cited

U.S. PATENT DOCUMENTS

| | | | |
|---|---|---|---|
| 6,551,122 B2 | 4/2003 | Bosy et al. | |
| 6,784,679 B2 | 8/2004 | Sweet et al. | |
| 6,828,774 B2 | 12/2004 | Bosy et al. | |
| 7,598,725 B2 | 10/2009 | Bosy et al. | |
| 8,736,288 B2 | 5/2014 | Lewinnek et al. | |
| 9,435,855 B2 | 9/2016 | Lewinnek et al. | |
| 10,451,652 B2 | 10/2019 | Sinsheimer et al. | |
| 11,280,827 B2 | 3/2022 | Thompson et al. | |
| 11,498,207 B2 | 11/2022 | Silva | |
| 11,782,072 B2 | 10/2023 | Moreira et al. | |
| 2003/0178988 A1* | 9/2003 | Kim | G01R 31/2887 324/750.19 |
| 2012/0043984 A1 | 2/2012 | Yashar et al. | |
| 2014/0240518 A1 | 8/2014 | Lewinnek et al. | |
| 2014/0240519 A1 | 8/2014 | Lewinnek et al. | |
| 2016/0033325 A1* | 2/2016 | Fusco | H04B 10/0795 356/73.1 |
| 2020/0341055 A1 | 10/2020 | Dunklee et al. | |

(Continued)

OTHER PUBLICATIONS

"Public Release UltraFLEXplus," Teradyne, Inc., [online] Retrieved from the Internet <URL:https://docplayer.net/183175028-Public-release-ultraflexplus.html> [retrieved on Feb. 13, 2024], (2019), 37 pages.

(Continued)

*Primary Examiner* — Tung X Nguyen
(74) *Attorney, Agent, or Firm* — ArentFox Schiff LLP

(57) ABSTRACT

An example test system includes a probe card configured to contact a device under test (DUT); a module including a first optical connector configured to contact a second optical connector on the DUT, with the first optical connector being for a fiber optic cable; and a motion system configured to move into, and out of, contact with the module. When the motion system is in contact with the module, the motion system is configured to move the module relative to the DUT in order to align the first optical connector to the second optical connector.

27 Claims, 9 Drawing Sheets

(56) References Cited

U.S. PATENT DOCUMENTS

| | | |
|---|---|---|
| 2021/0116496 A1 | 4/2021 | Lou et al. |
| 2022/0034963 A1* | 2/2022 | Keck ................ G01R 31/31903 |
| 2022/0050013 A1 | 2/2022 | Champavere |
| 2023/0305054 A1 | 9/2023 | Vettori et al. |

OTHER PUBLICATIONS

International Search Report and Written Opinion received for PCT Patent Application No. PCT/US2025/013342, mailed on May 9, 2025, 10 pages.

* cited by examiner

OPTICAL ALIGNMENT IN A TEST SYSTEM

TECHNICAL FIELD

This specification describes example implementations of systems and processes for aligning connectors in a test system.

BACKGROUND

A test system is configured to test the operation of a device. A device tested by a test system is referred to as a device under test (DUT). An example of a type of DUT that may be tested using a test system is a silicon photonic device (SPD). An example SPD is a device manufactured on a silicon chip or wafer, which is configured to produce, to manipulate, and/or to detect light.

SUMMARY

An example test system includes a probe card configured to contact a device under test (DUT); a module including a first optical connector configured to contact a second optical connector on the DUT, with the first optical connector being for a fiber optic cable; and a motion system configured to move into, and out of, contact with the module. When the motion system is in contact with the module, the motion system is configured to move the module relative to the DUT in order to align the first optical connector to the second optical connector. The test system may include one or more of the following features, either alone or in combination.

The motion system may be configured for electrical control or for pneumatic control. The motion system may include robotics configured to operate in multiple degrees of freedom. The motion system may be configured to move the module so as to move the first optical connector by single-digit millimeters or by less than one millimeter. The module may include a first plate. The first plate may include indentations. The motion system may include a motor and a second plate. The second plate may include protrusions configured to engage the indentations to enable movement of the module relative to the probe card and the DUT. The motion system may be configured to move the module towards or away from the probe card to cause the protrusions to engage to, or to disengage from, the indentations. The first plate may include three indentations and the second plate may include three protrusions to engage respective ones of the three indentations. A cross-section of the module may be substantially "T" shaped.

The test system may include one or more springs between the first plate and the probe card. The one or more springs may bias the first plate above the probe card and enable movement of the module in multiple degrees of freedom.

The probe card may include a probe head. The probe head may include electrical connections configured to contact corresponding electrical connections on the DUT. The fiber optic cable may route through the module. The test system may include a test instrument configured to test the DUT through the fiber optic cable and the first optical connector. The fiber optic cable may include a second connector configured to connect to, and to disconnect from, a backplane of the test system.

The module may include a first plate. The motion system may include a motor and a second plate. The first plate and the second plate may be magnetically attracted to each other to create connection of the first plate and the second plate in order to enable movement of the module relative to the probe card and the DUT. The first plate and the second plate may include components to implement a mechanical latch to hold the first plate and the second plate together in order to enable movement of the module relative to the probe card and the DUT. At least one of the first plate or the second plate may include a suction device configured to apply suction to hold the first plate and the second plate together in order to enable movement of the module relative to the probe card and the DUT.

The first optical connector may include silicon in which one or more optical structures are set. The first optical connector may include glass in which one or more optical structures are set.

The test system may include a control system configured to execute a test program to control movement of the motion system to control movement of the module relative to the probe card and the DUT. The DUT may include a semiconductor wafer or a semiconductor package. The motion system may be configured to move the module in six degrees of freedom. The motion system may be configured to move the module in degrees of freedom, which include: forward/backward, up/down, left/right, yaw, pitch, and roll.

The test system may include multiple instances of the module. Each instance of the module may be for aligning a respective first optical connector to a respective second optical connector on a respective DUT. The motion system may be configured to move into contact with each instance of the module and to move each instance of the module relative to the respective DUT.

The test system may include multiple instances of the module. Each instance of the module may be for aligning a respective first optical connector to a respective second optical connector on a respective DUT. The test system may include multiple instances of the motion system. Each instance of motion system may be configured to move into contact with each respective instance of the module and to move each respective instance of the module relative to the respective DUT.

An example method is performed on a test system. The method incudes the following operations: causing a motion system to come into contact with a module, where the module includes a first optical connector configured to contact a second optical connector on a DUT, and where movement of the motion system is automated; controlling the motion system to cause the first optical connector to align to the second optical connector and to contact the second optical connector; and testing the DUT though a fiber optic path that includes the first optical connector and the second optical connector. The method may include one or more of the following features either alone or in combination.

Controlling the motion system may be performed to move the module so as to move the first optical connector by single-digit millimeters or by less than one millimeter. Controlling the motion system may be performed to move the module in six degrees of freedom relative to the DUT.

Any two or more of the features described in this specification, including in this summary section, may be combined to form implementations not specifically described in this specification.

At least part of the devices, circuitry, systems, techniques, and processes described in this specification may be implemented or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the devices, circuitry, systems, techniques, and processes described in this specification may be implemented or controlled using a computing system comprised of one or more processing devices and memory storing instructions that are executable by the one or more processing devices to perform various control operations. The devices, circuitry, systems, techniques, and processes described in this specification may be configured, for example, through design, construction, composition, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Figure 1:
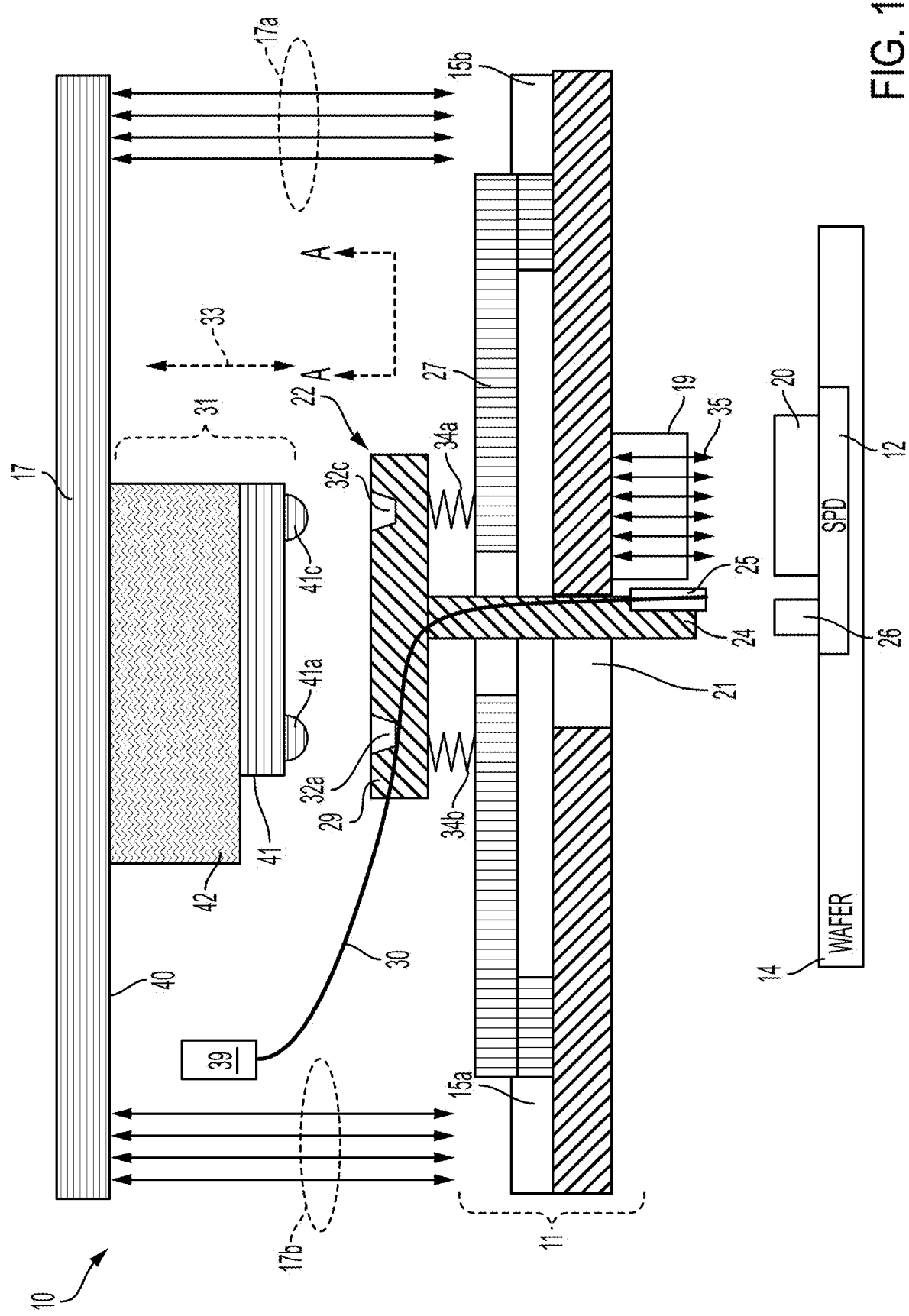
FIG. 1 is a block diagram of an example test system configured to align an optical connector on the test system to an optical connector on a device under test (DUT).

In testing of silicon photonic devices (SPDs), optical test fibers may need to be aligned to the SPD to micron to submicron precision for optical tests to be accurate. This may be accomplished by moving the optical fibers relative to the SPD while recording input or output optical power, and moving to the point with the highest optical power. In some cases, the SPD has to make electrical contact to the tester before optical alignment, and neither the SPD nor the tester can move laterally after electrical contact is made without risking damage to the electrical connections, so the optical subsystem moves relative to the tester and SPD. An issue is that all SPDs have similar requirements for a motion system, but some SPDs may have different spacing of fibers (e.g., a 250 micron (µm) pitch or a 127 µm pitch) or different arrangements of input and output fibers. It may be useful to change the arrangement of fibers when testing a different DUT, while re-using the same motion system. This means that a reliable coupling should be made between the tester and the optical subsystem whenever the probe card is changed. Examples of such coupling systems are described herein.

More generally, described herein are example implementations of systems and processes configured to test optical devices, such as SPDs. An SPD may be or include a device manufactured on a silicon chip or wafer, which is configured to produce, to manipulate, and/or to detect light. Examples of SPDs may include, but are not limited to, laser diodes, light-emitting diodes (LEDs), solar and photovoltaic cells, displays, fiber optic transceivers, and optical amplifiers. An SPD that is being tested, or that is to be tested, by a test system is a device under test (DUT).

An example SPD includes an optical connector, which is referred to as the "SPD optical connector". The SPD optical connector may optically connect to optical components on the SPD, such as one or more optical fibers or waveguides. The SPD optical connector may be part of an optical-electrical interface, which also electrically connects to electrical components on the SPD, such as an LED. The SPD optical connector is configured to connect to an optical connector of a test system, which is referred to as the "tester optical connector". Connection between the SPD optical connector and the tester optical connector creates an optical path over which optical signals can pass between the SPD and the test system. Optical signals from the test system to the SPD may be used to test the SPD. For example, the intensity, polarity and/or wavelength of optical signals may represent data to be processed by the SPD or may represent parameters of voltage or current to be applied to the SPD, for example, to illuminate an LED. Optical signals from the SPD to the test system may represent data or parameters that are produced by operation the SPD, including in response to received signals to test the SPD.

SPD optical connectors for different DUTs may be at different locations. The systems and processes described herein are therefore used to move the tester optical connector relative to the SPD in order to align the tester optical connector to the SPD optical connector. The systems and processes described herein may be used to finely align the tester optical connector relative to the SPD optical connector. For example, a probe card containing the tester optical connector may also connect electrically to the SPD. Deviations in placement of the SPD optical connector relative to these electrical connections may be accounted for by moving the tester optical connector relative to the SPD to align the tester optical connector to the SPD optical connector. In some implementations, alignments of the tester optical connector to the SPD optical connector may be on the order of single-digit microns (µm) or less than one micron (µm), that is, sub-micron. In some implementations, alignments of the tester optical connector to the SPD optical connector may be on the order of tens of microns or more. Any amount of alignment may be implemented.

In some implementations, the SPD may be part of—for example, manufactured on-a semiconductor wafer or a semiconductor package containing multiple SPDs to be tested. The probe head, or a component thereof like the probe card, may move across the wafer to test the SPDs on the wafer. For each SPD, the probe head may connect electrically to the SPD and move the tester optical connector relative to the SPD to align the tester optical connector to a corresponding SPD optical connector. Following testing, individual SPDs may be separated from the wafer.

Figure 2:
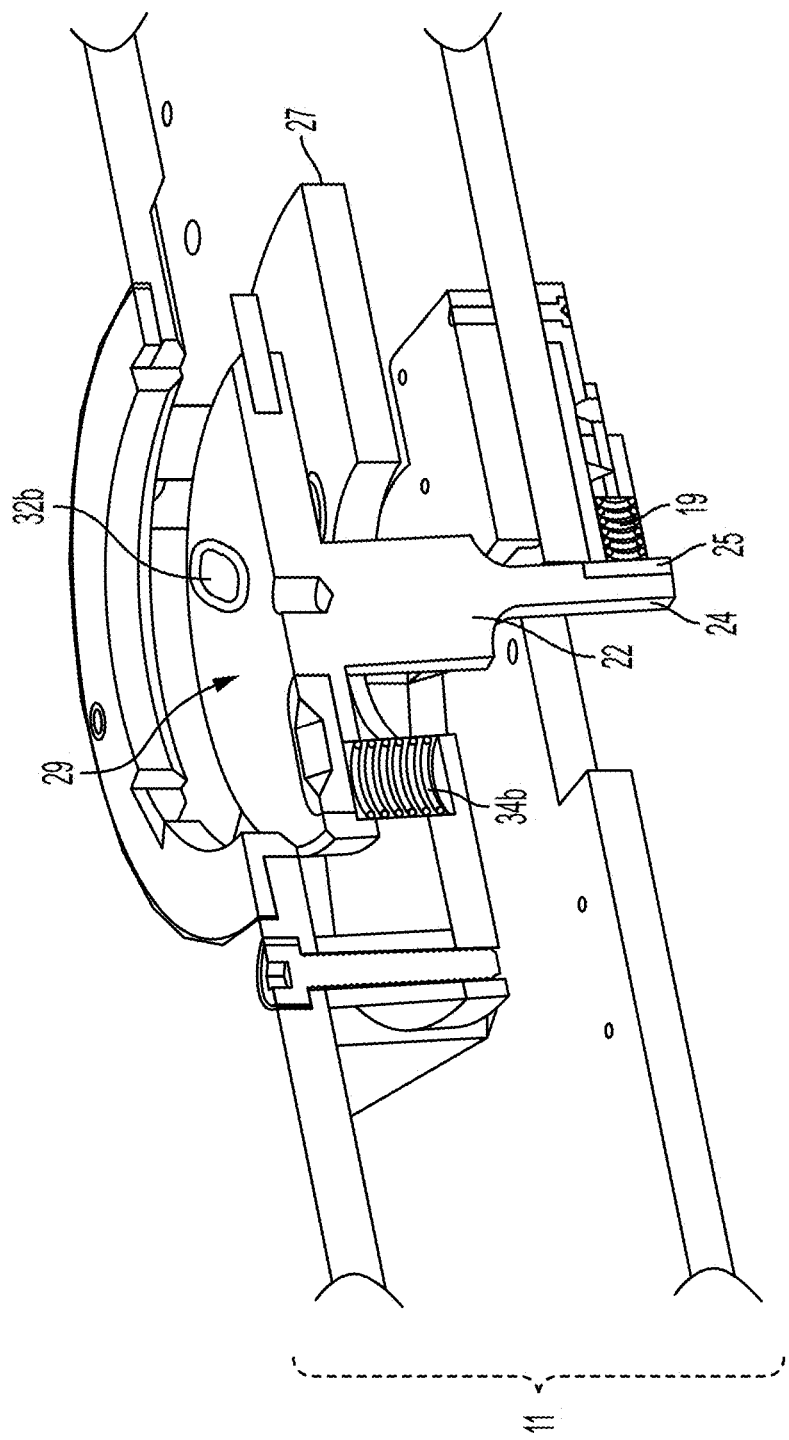
FIG. 2 is a partial, cross-sectional, perspective view of components included in an example implementation of the test system of FIG. 1.
Figure 3:
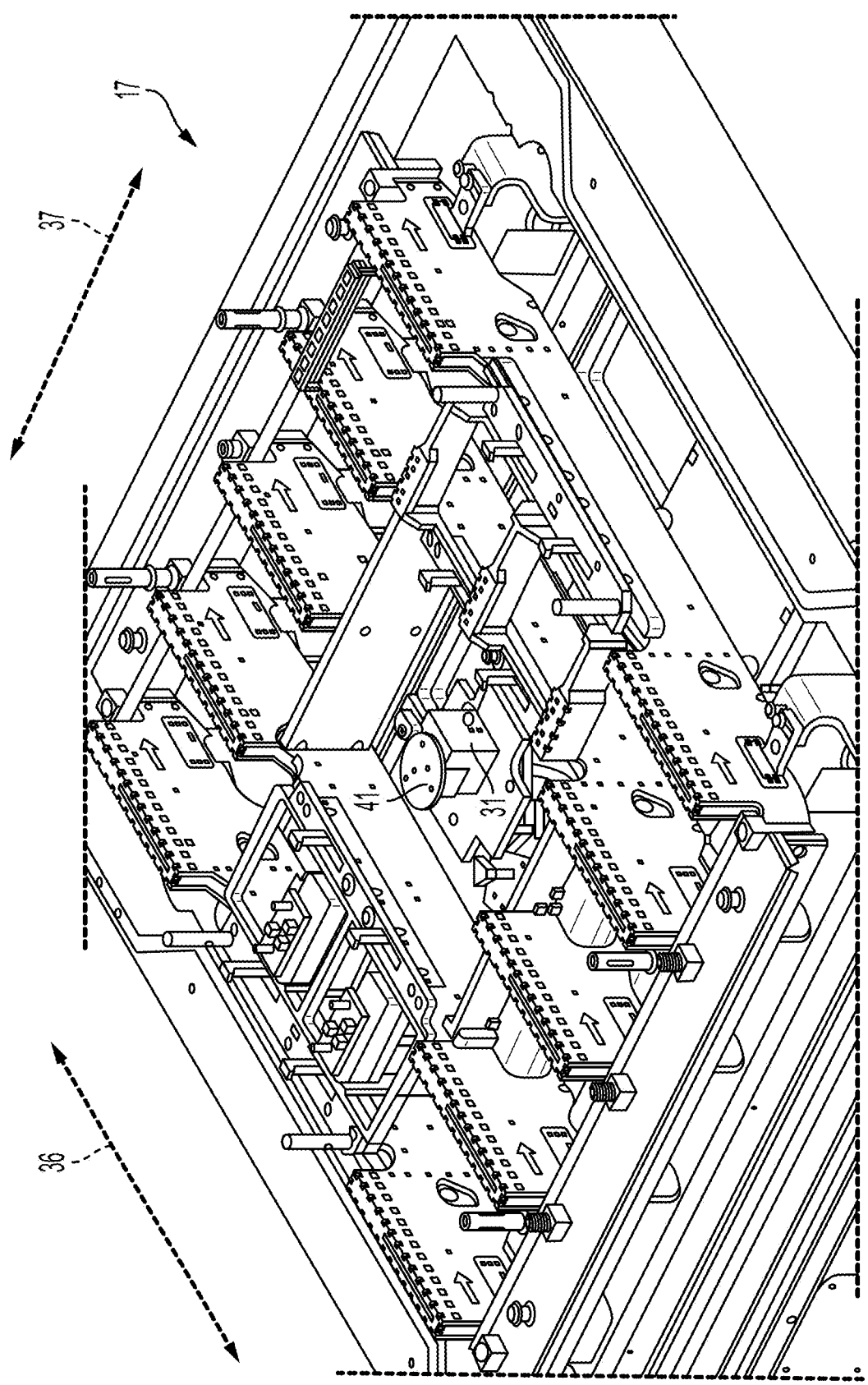
FIG. 3 is a bottom, perspective view of components included in an example probe head in an example implementation of the test system of FIG. 1.
Figure 4:
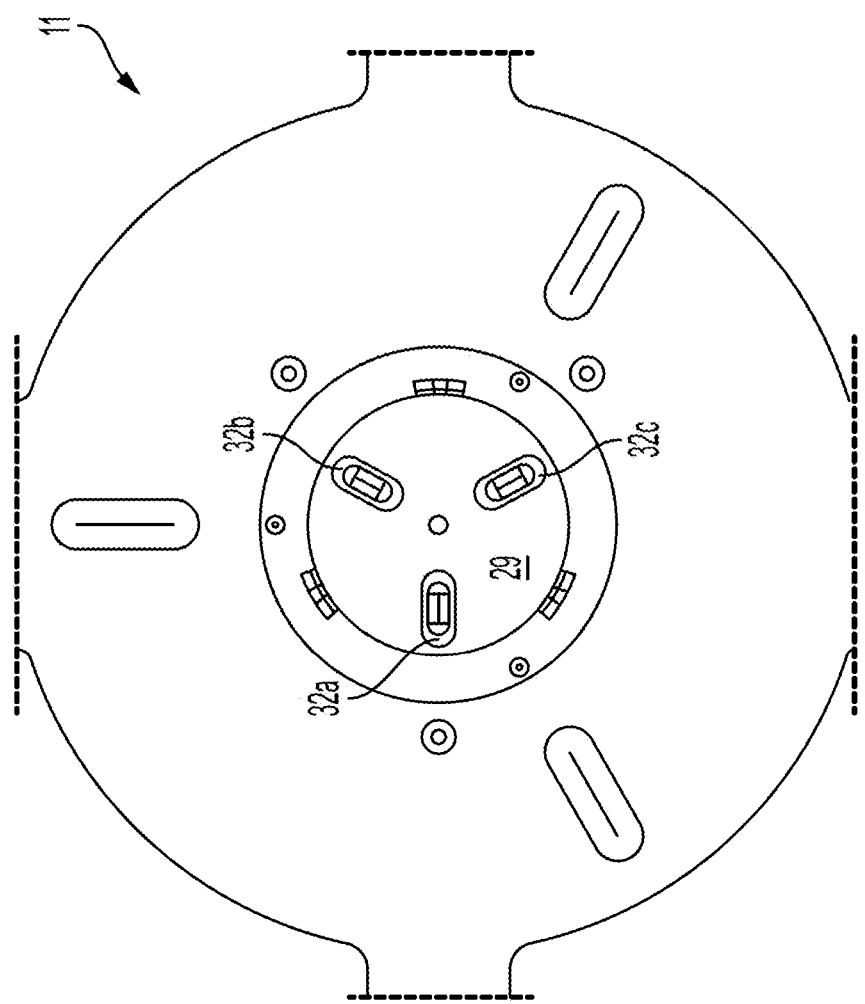
FIG. 4 is a partial, top view of components included in an example probe card in an example implementation of the test system of FIG. 1
Figure 5:
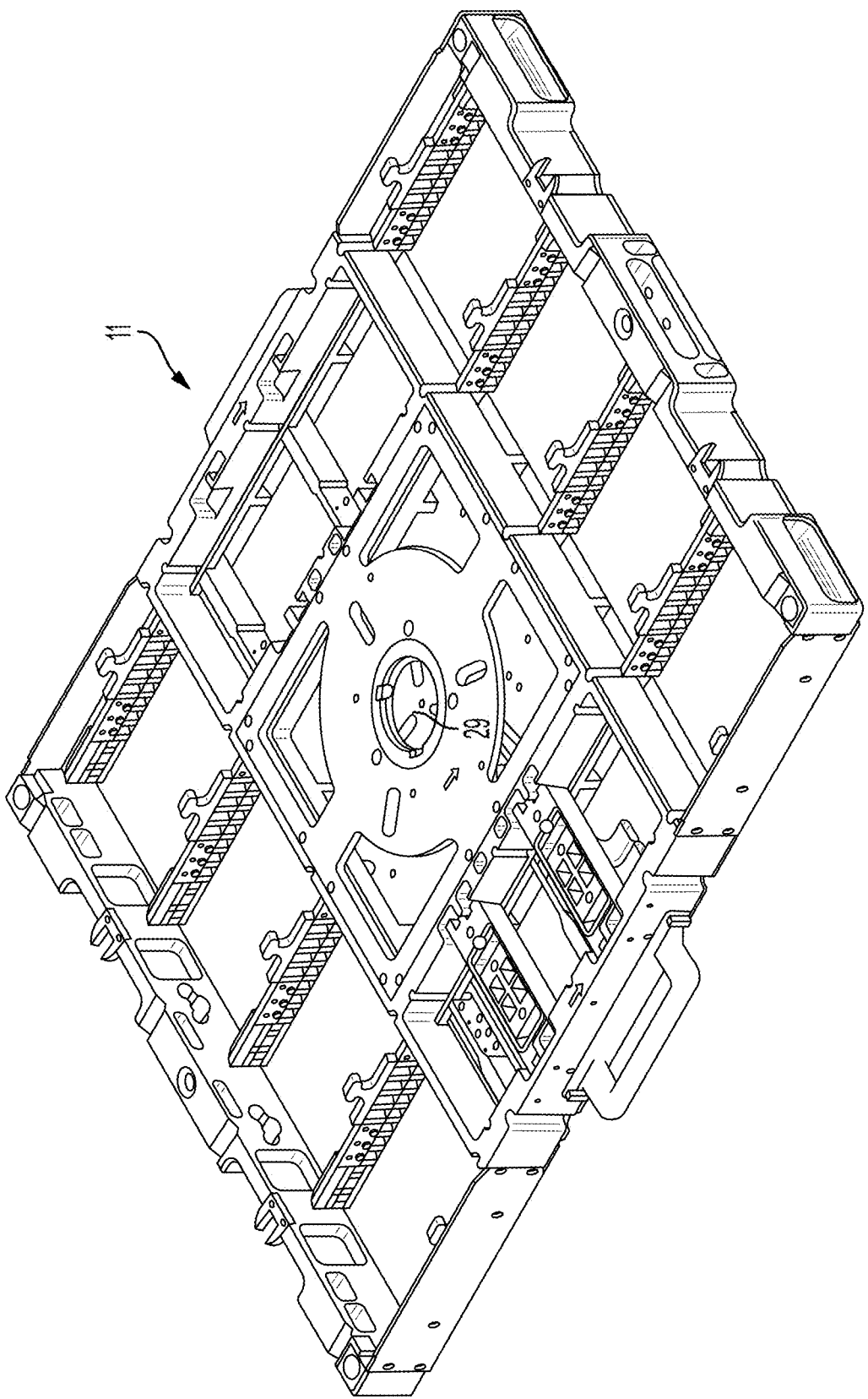
FIG. 5 is a top, perspective view of components included in an example probe card in an example implementation of the test system of FIG. 1.

FIG. 1 is a block diagram of components of an example test system 10 of the type described above. FIG. 2 shows, in partial cross-section, components of an implementation of the system of FIG. 1. FIG. 3 shows, in perspective, a bottom view of part of a probe head containing components of an implementation of the system of FIG. 1. FIG. 4 is a top view of part of a probe card containing components of an implementation of the system of FIG. 1. FIG. 5 show, in perspective, a top view of a probe card containing components of an implementation of the system of FIG. 1.

Referring to FIG. 1, test system 10 includes a probe card 11 configured to contact a DUT, such as SPD 12 on wafer 14. An example probe card includes electrical and mechanical interfaces that enable testing operation of a device while the device is still part of wafer 14. Probe card 11 may be a printed circuit board (PCB) or other structure configured to provide electrical connection between SPD 12 and test electronics in probe head 17. For example, probe card 11 may include one or more conductive layers and vias configured the pass electrical signals between the SPD and test electronics. Probe card 11 may include one or more passive and/or active electronic devices to condition, to process, and/or route electrical signals.

Probe card 11 may include electrically-conductive pads or electrical connectors 15a, 15b configured to accept, and to mate to, one or more electrical connectors, lines, or cables 17a, 17b from test electronics in probe head 17. Probe card 11 also includes one or more electrically-conductive pads or electrical connectors 19 configured to connect to corresponding electrically-conductive pads or electrical connectors 20 on SPD 12. The resulting electrical connections create an electrical pathway from SPD 12, through probe card 11, to test electronics in probe head 17. Electrical signals may pass between SPD 12 and the probe head over this electrical pathway.

In this example, probe card 11 also includes a through-hole 21 to accommodate part of module 22. As described below, module 22 is a structure having a shaft 24 to hold tester optical connector 25 and to move tester optical connector 25 relative to SPD 12 and SPD optical connector 25.

Through-hole 21 may pass entirely through probe card 11 to allow shaft 24 of module 22 to pass through probe card 11 so that tester optical connector 25 can contact a corresponding SPD optical connector 26 on SPD 12. Through-hole 21 may be circular in shape. The dimensions of through-hole 21 may be based on the amount of movement needed for shaft 24 to move within probe card 11 and the size of shaft 24. For example, through-hole 21 may have a diameter on the order of single-digit centimeters or double-digit millimeters. Such dimensions may accommodate shaft 24 and enable movement of shaft 24 within through-hole 21 in a range of single-digit microns (μm) or less. Such dimensions may also enable movement of shaft 24 within through-hole 21 in a range of single-digit millimeters or more to enable both coarse and fine alignments between tester optical connector 25 and SPD optical connector 26.

In some implementations, probe card 11 includes a support structure 27. Support structure 27 may be connected physically to probe card 11 and, in some cases, need not include electrical connections to probe card 11. As shown, in this example, support structure 27 is elevated relative to the rest of probe card 11 to support a part 29 of module 22 that interfaces to a motion system 31. Support structure 27 may be elevated relative to the rest of probe card 11 to prevent damage to structures, such as passive and/or active electronic devices, on probe card 11 under support structure 27. In some cases, such damage could, in the absence of support structure 27, occur during movement of module 22 relative to SPD 12, as described below.

Module 22 may be considered to be part of probe card 11. In some implementations, module 22 includes system interface 29 and shaft 24. In this example, system interface 29 and shaft 24 are orthogonal to each other; however, in other implementations, the angle between system interface 29 and shaft 24 may be oblique. Shaft 24 holds tester optical connector 25. Tester optical connector 25 may be connected to, or an integral part of (for example, formed as part of), shaft 24. As a result, tester optical connector does not move relative to shaft 24, but rather moves along with movement of shaft 24.

Tester optical connector 25 is configured to optically connect fiber optics, such as fiber optic cable 30, to complementary SPD optical connector 26. Examples of types of optical connectors that may be used for tester optical connector 25 and complementary SPD optical connector 26 include, but are not limited to, ST (straight tip) connectors, SC (standard connector) connectors, LC (Lucent® connector) connectors, 10G-CX4 connectors, Infiniband™ (4×) connectors, MTRJ (mechanical transfer-registered jack (connectors), MTP/MPO connectors, RJ-45 (registered jack-45) connectors, D4 connectors, ESCON (enterprise systems connection) connectors, opti-jack connectors, FDDI (fiber distributed data interface) connectors, MU (multi-termination unibody) connectors, CS® connectors, or SN® compact connectors.

In some implementations, tester optical connector 25 may include silicon in which optical structures, which make optical connection to SPD optical connector 26, are set. In some implementations, tester optical connector 25 may include glass in which optical structures, which make optical connection to SPD optical connector 26, are set.

Shaft 24 may be hollow or partially hollow with a through-hole therein to receive and to hold fiber optic cable 30. An example fiber optic cable 30 includes one or more optical fibers, e.g., either single mode, multimode, polarization-maintaining or a mixture of the three, over which optical signals pass. Fiber optic cable 30 connects optically to tester optical connector 25 so that optical signals can pass between fiber optic cable 30 and SPD 12 via an optical connection between tester optical cable 30 and SPD optical cable 30. In some implementations, shaft 24 may hold multiple fiber optic cables that connect optically to tester optical connector 25 to enable optical signals to pass between each fiber optic cable 30 and SPD 12 via an optical connection between tester optical cable 30 and SPD optical cable 30. Shaft 24 may hold fiber optic cable 30 tightly or loosely. For example, when fiber optic cable 30 is held tightly, fiber optic cable does not move through or relative to shaft 24. For example, when fiber optic cable 30 is held loosely, fiber optic cable 30 may move through or relative to shaft 24.

Module 22 also includes system interface 29. System interface 29 is so named because it is the part of module 22 that mechanically interfaces to motion system 31, described below. In some implementations, system interface 29 is a plate or other flat structure containing indentations that are configured for mating to motion system 31. In some implementations, system interface 29 need not be flat but rather may have any shape that is complementary to the part of motion system 31 that mates to module 22 or that enables that part of the motion system to mate to module 22.

System interface 29 may be hollow or partially hollow with a through-hole therein to receive and to hold fiber optic cable 30. Accordingly, fiber optic cable 30 passes through both shaft 24 and system interface 29. System interface 29 may hold fiber optic cable 30 tightly or loosely. For example, when fiber optic cable 30 is held tightly, fiber optic cable does not move through or relative to system interface 29. For example, when fiber optic cable 30 is held loosely, fiber optic cable 30 may move through or relative to system interface 29.

Referring also to FIGS. 2, 4, and 5, system interface 29 may be circular or have any other appropriate shape taken along cross-section A-A. System interface 29 may have multiple indentations arranged around a radius thereof or at any other appropriate locations on system interface 29. In the example of FIGS. 2, 4, and 5 system interface 29 includes three indentations 32a, 32b, and 32c; however, other implementations may contain more than three indentations or fewer than three indentations; for example, one, two, four, five, six, and so forth indentations. The indentations may have shapes that complement or accommodate shapes of protrusions on motion system 31, as described below. In the example of FIGS. 2, 4, and 5, the indentations have a stadium shape in lateral or horizontal cross-section, which is a rectangle with round ends. However, in other implementations, the indentations may have shapes that include, but are not limited to, round, oval, oval or circular ending in a pointed V-shape at one end, elliptical, or rectangular in lateral or horizontal cross-section. In some implementations, the longitudinal or vertical cross-section of module 22 of FIGS. 1 and 2 is generally "T"-shaped, as shown in the figures.

Referring to FIG. 1, system 10 may include one or more springs 34a, 34b between system interface 29 and support structure 27 of probe card 11 (see also FIG. 2). In some implementations, there are three springs located at roughly the same radius as the indentations but on the other side of system interface 29 from the indentations. However, this is not a requirement and the springs may be at any appropriate locations. As shown, springs 34a, 34b bias system interface 29 above probe card 11 and enable movement of module 22 in multiple degrees of freedom. That is, springs 34a, 34b bias system interface 29 to a position above probe card 11 that is imposed by the spring load. In some implementations, springs 34a, 34b are connected to support structure 27 in such as way as to enable movement of module 22 in six degrees of freedom relative to SPD 20, which include forward/backward, up/down, left/right, yaw, pitch, and roll. For example, the springs may slide across the surface of support structure 27 or within tracks (not shown) on support structure 27. Because support structure offset relative to the rest of the probe card, this movement will not damage circuitry or components on the probe card.

Referring to FIG. 1, the up/down movement along arrows 35 enables creation of an optical connection between tester optical connector 25 and SPD optical connector 26. Referring to FIG. 3 forward/backward and left/right movement along arrows 36 and 37, respectively, enables movement of module 22 relative to SPD 12 and, thus, of tester optical connector 25 relative to SPD optical connector 26 to align the two for connection. The yaw, pitch, and roll movements may facilitate creation of the optical connection between tester optical connector 25 and SPD optical connector 26 by enabling, e.g., additional force to be applied to part of tester optical connector 25.

As shown in FIG. 1, fiber optic cable 30 may terminate in an optical connector 39 that is configured to connect to, and to disconnect from, a backplane 40 of probe head 17. The connection and disconnection may enable connection to different test instruments in the test system, examples of which are described herein.

As shown in FIG. 1, test system 10 includes motion system 31 configured to move into, and out of, contact with module 22 in the directions of arrows 33, e.g., through movement of the motion system alone or in response to movement of part of probe head 17 relative to probe card 11. When motion system 31 is in contact with module 22, motion system 31 is configured to move module 22 relative to SPD 12 in order to align tester optical connector 25 to the SPD optical connector 26. To this end, motion system 31 includes a connecting structure 41, such as a plate.

Referring also to FIG. 3, connecting structure 41 may be circular or have any other appropriate shape. Connecting structure 41 includes protrusions that mate to complementary indentations on system interface 29. In some implementations, connecting structure 41 may have multiple protrusions arranged around a radius thereof. In the example of FIGS. 1 and 3, connecting structure 41 includes three protrusions (only 41a, 41c shown in FIG. 1); however, other implementations may contain more than three protrusions or fewer than three protrusions; for example, one, two, four, five, six, and so forth protrusions. The protrusions may have shapes and locations that complement the shapes and locations of indentations on system interface 29, as noted above. In some implementations, the protrusions have a stadium shape in lateral or horizontal cross-section, which is a rectangle with round ends. However, in other implementations, the protrusions may have shapes that are, but are not limited to, round (e.g., ball-shaped), oval, elliptical, oval or circular with a V-shape at one end, or rectangular in lateral or horizontal cross-section.

In some implementations, motion system 31 includes robotics that is controllable to cause connecting plate to move in the six degrees of freedom described previously. In some implementations, the robotics include a housing 42 that holds one or more motors configured to move connecting structure 41 relative to system interface 29 in the six degrees of freedom described previously. Motion system 31 may be implemented using electrical control or pneumatic control in some implementations.

In some implementations, system interface 29 is or includes a first plate and connecting structure 41 is or includes a second plate. The first plate and the second plate may be magnetically attracted to each other to create and/or to hold or supplement a connection of the first plate and the second plate in order to enable movement of module 22 relative (e.g., towards or away from) to probe card 11 and the SPD 12. In some implementations, the first plate and the second plate include components to implement a mechanical latch to hold the first plate and the second plate together in order to enable movement of module 22 relative to probe card 11 and the SPD 12. In some implementations, at least one of the first plate or the second plate is connected to a suction device (not shown) configured to apply suction through the plate to the other plate to hold the first plate and the second plate together in order to create and/or to hold or supplement a connection the first plate and the second plate in order to enable movement of module 22 relative to probe card 11 and the SPD 12.

Figure 6:
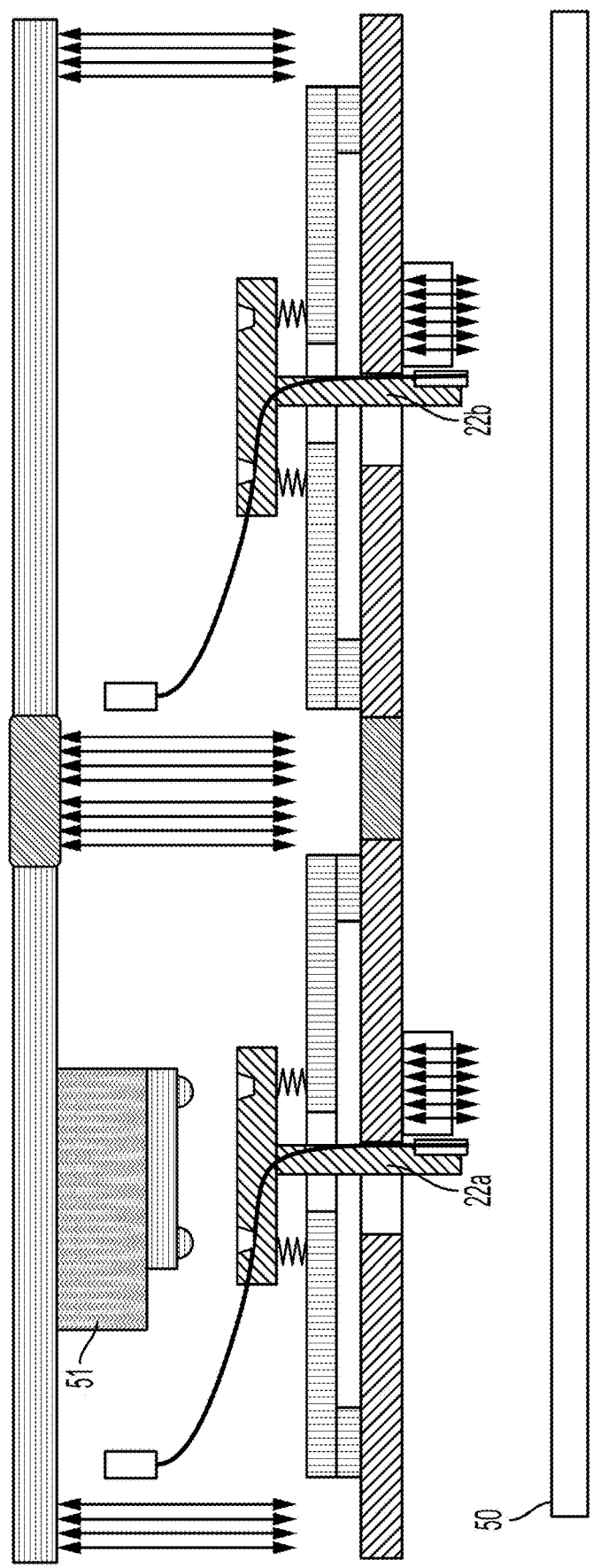
FIG. 6 is a block diagram of another implementation of example test system configured to align an optical connector on the test system to an optical connector on a DUT.

Referring to FIG. 6, in some implementations, the test system includes multiple instances of module 22. Each instance 22a to 22b of module 22 is arranged at a different location relative to a wafer 50 under test. Each instance 22a, 22b of module 22 is configured to connected to motion system 51, which is an implementation of motion system 31, and, by virtue of movement of the motion system, align a different tester connector to respective SPD connector on wafer 50. The motion system 51 is configured to move into contact with each instance 22a, 22b of module 22 and to move each instance of the module relative to the SPD to make the connection.

Figure 7:
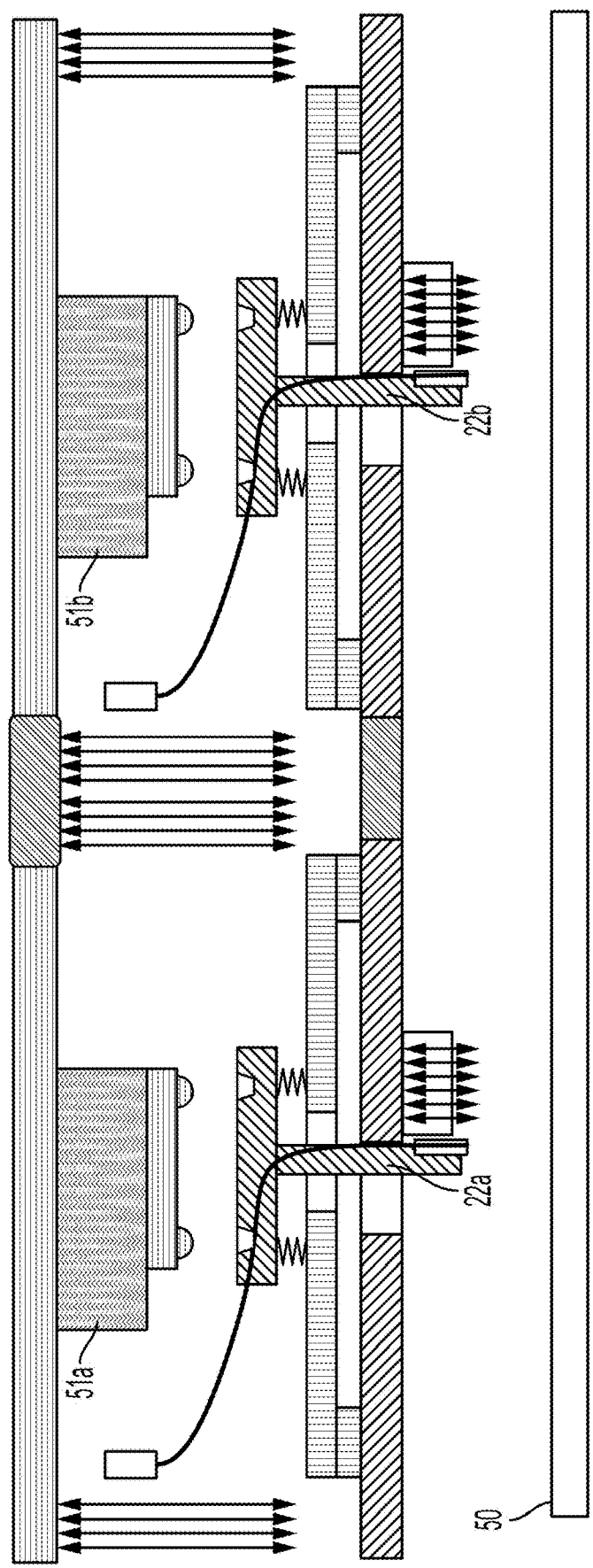
FIG. 7 is a block diagram of another implementation of example test system configured to align an optical connector on the test system to an optical connector on a DUT.

Referring to FIG. 7, in some implementations, there may be multiple instances of motion system 51a, 51b, which are movable to contact respective instances 22a, 22b of the module 22. Each instance of the motion system is controlled as described herein. Each motion system may be paired with a particular module in that the motion system is only capable of contacting and moving that particular module. Each motion system/module pair may be used to move over a predefined area of wafer 50. Each area for each motion system/module pair may be separate and may not overlap.

Figure 8:
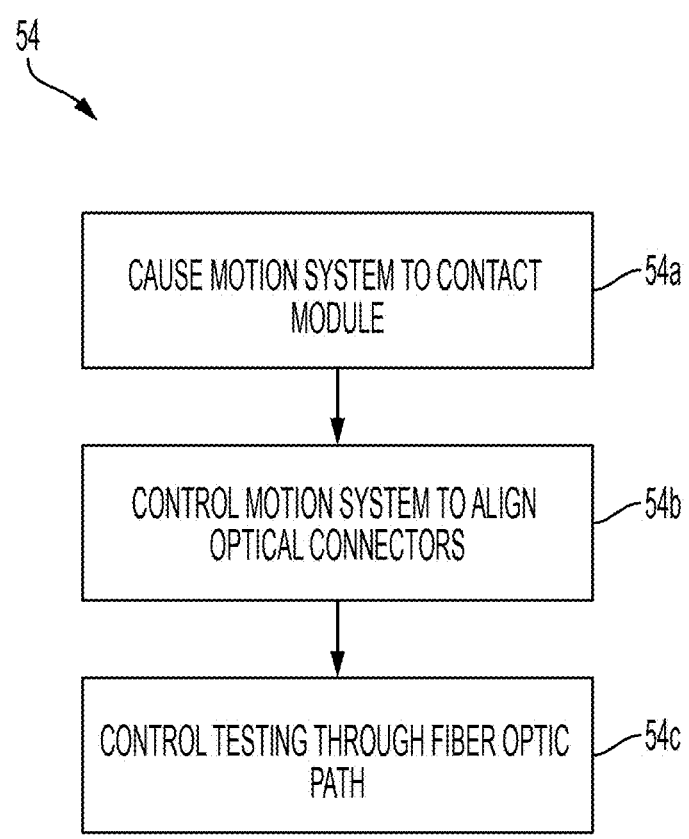
FIG. 8 is a flowchart containing operations included in an example process for aligning optical connectors on a test system and on a DUT.

FIG. 8 is a flowchart showing operations included in an example process that may use the test systems described herein. The operations of process 54 may be controlled by, or performed by, a control system, such as that described herein. Process 54 is described with respect to the example implementation shown in FIG. 1.

Process 54 includes causing motion system 31 to come into contact with module 22. This may include causing (54a) connecting structure 41 to contact system interface 29. Movement of the motion system may be automated in the sense that its movements do not include or require physical intervention from a user. The motion system is controlled (54b) to cause a first optical connector to align to a second optical connector and to contact the second optical connector. For example, motion system 31 may control module 22 as described herein to cause shaft 24 to move relative to SPD 12, thereby aligning tester optical connector 25 with SPD optical connector 26. In this regard, the control system may know the location of each SPD optical connector and control module 22 to move to that location. The control system may control module 22 to move downward in the direction of arrows 19 of FIG. 1 to cause tester optical connector 25 to mate to SPD optical connector 26. Thereafter, the control system may initiate and control (54c) testing the SPD (which is a DUT) through a fiber optic path created through mating of tester optical connector 25 and SPD optical connector 26.

Figure 9:
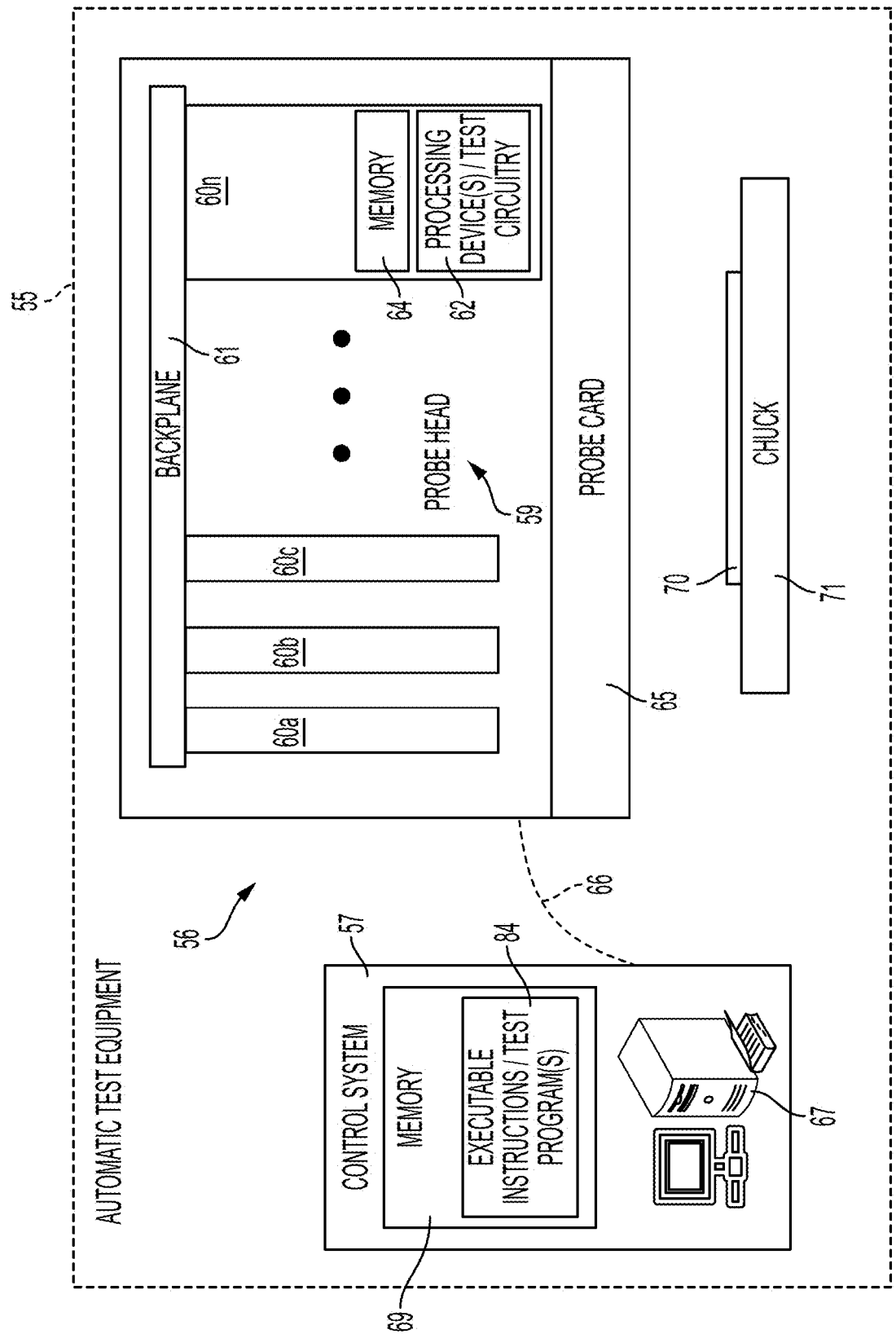
FIG. 9 is a block diagram of an example test system configured to incorporate the components shown in FIGS. 1 to 8.

FIG. 9 is a block diagram showing example components of example automatic test equipment (ATE) 55 that includes a testing device/apparatus (referred to also as a "tester") 56 and a control system 57.

ATE 55 includes probe head 59, examples of which is described with respect to FIG. 1 and elsewhere herein. Probe head 59 includes multiple test instruments 60a to 60n (where n>3), each of which may be configured, as appropriate, to implement and/or to control testing of DUTs such as SPDs. Although only four test instruments are shown, ATE 55 may include any appropriate number of test instruments, including one or more residing outside of probe head 59. The test instruments may connect to a backplane 61, which may include optical connector(s) that mate to optical connector 39 of FIG. 1.

The test instruments may be hardware devices that may each include one or more processing devices and/or circuitry 62 to implement and to control testing and memory 64 to store test data and or test programs to test SPDs. The test instruments may be configured—for example, programmed—to output test signals such as optical and/or electrical signals to test SPDs. The test signals to test the SPDs may be or include commands, instructions, data, parameters, variables, test vectors, and/or any other information designed to elicit response(s) from the SPD. The one or more processing devices 62 may also execute instructions to communicate with control system 57 and/or and to analyze responses to the test signals.

Probe card 65, examples of which are described with respect to FIG. 1 and elsewhere herein, may be electrically and mechanically connected to probe head 59 and controllable by one or more of the test instruments and/or the control system to make optical and electrical contact with SPDs on a wafer 70 held on chuck 71 to test the SPDs. Operation of individual components of the probe card, such as those described herein, may be controlled by one or more of test instruments 60a to 60n and/or by control system 57.

Control system 57 may be configured—e.g., programmed—to communicate with test instruments 60a to 60n to direct and/or to control testing of the DUTs. In some implementations, this communication 66 may be over a computer network or via a direct connection such as a computer bus or an optical medium. In some implementations, the computer network may be or include a local area network (LAN) or a wide area network (WAN). The control system may be or include a computing system comprised of one or more processing devices 67 (e.g., microprocessor(s)) and memory 69 for storing instructions to control operation of the ATE and/or testing. Memory 69 also stores one or more test programs 84 to execute and/or to send to the test instruments for execution. In this regard, control system 57 may be configured to provide test programs and/or test signals to test instruments 60a to 60n in the probe head, which the test instrument(s) use to test the SPD. Control system 57 may also be configured to receive SPD response signals (e.g., measurement data) from the test instrument(s) and to determine whether the corresponding DUT has passed or failed testing.

In some implementations, the control functionality is centralized in processing device(s) 67. In some implementations, all or part of the functionality attributed to control system 57 may also or instead be implemented on a test instrument and/or all or part of the functionality attributed to one or more test instruments may also or instead be implemented on control system 57. For example, the control system may be distributed across processing device(s) on one or more of test instruments 60a to 60n.

All or part of the example systems and example processes described in this specification and their various modifications may be configured or controlled at least in part by one or more computers such as control system 57 using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a circuit, part, subroutine, or other unit suitable for use in a computing environment. A computer program can be deployed to be executed on one computer or on multiple computers at one site or distributed across multiple sites and interconnected by a network.

Actions associated with configuring or controlling the test system and processes described herein can be performed by one or more programmable processors executing one or more computer programs to control or to perform all or some of the operations described herein. All or part of the test systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

As used herein, the terms "comprises," "comprising," "includes," "including," "has," "having," "contains," "containing," and any variations thereof, are intended to cover a non-exclusive inclusion, such that systems, techniques, apparatus, structures, processes, or other subject matter described or claimed herein that includes, has, or contains an element or list of elements does not include only those elements but can include other elements not expressly listed or inherent to such systems, techniques, apparatus, structures, processes or other subject matter described or claimed herein.

All examples described herein are non-limiting.

In the description and claims provided herein, the adjectives "first", "second", "third", and the like do not designate priority or order unless context suggests otherwise. Instead, these adjectives may be used solely to differentiate the nouns that they modify.

Any mechanical, optical, or electrical connection herein may include a direct physical connection or an indirect connection that includes one or more intervening components. A connection between two electrically conductive components is an electrical connection unless context suggests otherwise. A connection between two optical components is an optical connection unless context suggests otherwise.

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A test system comprising:
a probe card configured to move relative to a device under test (DUT);
a module connected to optical fibers, the module being associated with the probe card and being configured to move relative to the probe card and the DUT; and
a motion system configured to move into, and out of, contact with the module, wherein, when the motion system is in contact with the module, the motion system is configured to move the module relative to the probe card and the DUT in order to align the optical fibers to the DUT and to create an optical connection between the optical fibers and the DUT.

2. The test system of claim 1, wherein the motion system is configured for electrical control or for pneumatic control.

3. The test system of claim 1, wherein the motion system comprises robotics configured to operate in multiple degrees of freedom.

4. The test system of claim 1, wherein the motion system is configured to move the module so as to move the optical fibers by single-digit millimeters or by less than one millimeter.

5. The test system of claim 1, wherein the module comprises a first plate, the first plate comprising indentations; and
wherein the motion system comprises a motor and a second plate, the second plate comprising protrusions configured to engage the indentations to enable movement of the module relative to the probe card and the DUT.

6. The test system of claim 5, wherein the motion system is configured to move the second plate towards first plate to cause the protrusions to engage the indentations.

7. The test system of claim 5, wherein the first plate comprises three indentations and the second plate comprises three protrusions to engage respective ones of the three indentations.

8. The test system of claim 4, wherein a cross-section of the module is substantially "T" shaped.

9. The test system of claim 5, further comprising:
one or more springs between the first plate and the probe card, the one or more springs biasing the first plate above the probe card and enabling movement of the module in multiple degrees of freedom.

10. The test system of claim 1, further comprising:
a probe head connected to the probe card, the probe head comprising electrical connections configured to contact corresponding electrical connections on the DUT.

11. The test system of claim 1, wherein the optical fibers are part of a fiber optic cable that is routed through the module.

12. The test system of claim 10, further comprising:
a test instrument configured to test the DUT through the optical connection and a fiber optic cable, the fiber optic cable comprising a second connector configured to connect to, and to disconnect from, a backplane of the test system.

13. The test system of claim 1, wherein the module comprises a first structure; and
wherein the motion system comprises a motor and a second structure, the first structure and the second structure being magnetically attracted to each other to create connection of the first structure and the second structure in order to enable movement of the module relative to the probe card and the DUT.

14. The test system of claim 1, wherein the module comprises a first structure; and
wherein the motion system comprises a motor and a second structure, the first structure and the second structure comprising components to implement a mechanical latch to hold the first structure and the second structure in order to enable movement of the module relative to the probe card and the DUT.

15. The test system of claim 1, wherein the module comprises a first structure;

wherein the motion system comprises a motor and a second structure; and wherein at least one of the first structure or the second structure comprises a suction device configured to apply suction to hold the first structure and the second structure together in order to enable movement of the module relative to the probe card and the DUT.

16. The test system of claim 1, further comprising silicon in which the optical fibers are set.

17. The test system of claim 1, further comprising glass in which the optical fibers are set.

18. The test system of claim 1, further comprising:
a control system configured to execute a test program to control movement of the motion system to control movement of the module relative to the probe card and the DUT.

19. The test system of claim 1, wherein the DUT comprises a silicon photonic device on a semiconductor wafer or a semiconductor package.

20. The test system of claim 1, wherein the motion system is configured to move the module in six degrees of freedom.

21. The test system of claim 20, wherein the motion system is configured to move the module in degrees of freedom comprising: forward/backward, up/down, left/right, yaw, pitch, and roll.

22. The test system of claim 1, comprising:
multiple instances of the module, each instance of the module for aligning a respective set of optical fibers to a respective DUT;
wherein the motion system is configured to move into contact with each instance of the module and to move each instance of the module relative to the respective DUT.

23. The test system of claim 1, comprising:
multiple instances of the module, each instance of the module for aligning a respective set of optical fibers to a respective DUT; and
multiple instances of the motion system, each instance of motion system being configured to move into contact with each respective instance of the module and to move each respective instance of the module relative to the respective DUT.

24. A method performed on a test system, the method comprising:
causing a motion system to come into contact with a module, the module being connected to optical fibers and being configured for movement relative to a probe card and a device under test (DUT), where movement of the motion system is automated;
controlling the motion system to move the module to cause the optical fibers to align to the DUT and to create an optical connection between the optical fibers and the DUT; and
testing the DUT though a fiber optic path that includes the optical connection.

25. The method of claim 24, wherein controlling the motion system is performed to move the module so as to move the optical fibers by single-digit millimeters or by less than one millimeter.

26. The method of claim 24, wherein controlling the motion system is performed to move the module in six degrees of freedom relative to the DUT.

27. The method of claim 24, wherein the DUT comprises a silicon photonic device on a semiconductor wafer or a semiconductor package.

* * * * *